US011685832B2

(12) United States Patent
Roth et al.

(10) Patent No.: US 11,685,832 B2
(45) Date of Patent: Jun. 27, 2023

(54) FIRE-RETARDANT POLYAMIDES COMPRISING PVP

(71) Applicant: BASF SE, Ludwigshafen am Rhein (DE)

(72) Inventors: Michael Roth, Ludwigshafen (DE); Michaela Shaun Heussler, Ludwigshafen (DE); Klaus Uske, Ludwigshafen (DE); Christoph Minges, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 944 days.

(21) Appl. No.: 16/490,213

(22) PCT Filed: Feb. 27, 2018

(86) PCT No.: PCT/EP2018/054762
§ 371 (c)(1),
(2) Date: Aug. 30, 2019

(87) PCT Pub. No.: WO2018/158224
PCT Pub. Date: Sep. 7, 2018

(65) Prior Publication Data
US 2022/0002542 A1    Jan. 6, 2022

(30) Foreign Application Priority Data
Mar. 1, 2017   (EP) ..................... 17158705

(51) Int. Cl.
*C08L 77/00*  (2006.01)
*C08L 39/06*  (2006.01)
*C08K 3/32*  (2006.01)
*C08K 5/3492*  (2006.01)
*C08K 5/5313*  (2006.01)

(52) U.S. Cl.
CPC ............... *C08L 77/00* (2013.01); *C08K 3/32* (2013.01); *C08K 5/34924* (2013.01); *C08K 5/5313* (2013.01); *C08L 39/06* (2013.01); *C08K 2003/329* (2013.01)

(58) Field of Classification Search
CPC .................. C08K 3/32; C08K 2003/321–329
See application file for complete search history.

(56) References Cited

U.S. PATENT DOCUMENTS

| 4,360,617 | A | 11/1982 | Muller |
| 4,537,949 | A | 8/1985 | Schmidt et al. |
| 4,540,772 | A | 9/1985 | Pipper et al. |
| 4,789,698 | A | 12/1988 | Bonten et al. |
| 5,308,902 | A | 5/1994 | Holger et al. |
| 6,881,773 | B2 | 4/2005 | Zingg et al. |
| 2005/0143503 | A1 | 6/2005 | Bauer et al. |
| 2009/0012229 | A1 | 1/2009 | Desbois et al. |
| 2011/0190428 | A1 | 8/2011 | Kniesel |
| 2013/0210975 | A1 | 8/2013 | Hoerold et al. |
| 2016/0009918 | A1 | 1/2016 | Hoerold et al. |
| 2016/0304715 | A1 | 10/2016 | Zucchelli |

FOREIGN PATENT DOCUMENTS

| DE | 102010018680 A1 | 11/2011 |
| DE | 102013004046 A1 | 9/2014 |
| EP | 0129195 A2 | 12/1984 |
| EP | 0129196 A2 | 12/1984 |
| EP | 0241702 A1 | 10/1987 |
| EP | 1522551 A1 | 4/2005 |
| EP | 1994075 A2 | 11/2008 |
| EP | 2328965 A2 | 6/2011 |
| JP | 05194570 A | 8/1993 |
| JP | 2002234964 A | 8/2002 |
| JP | 2003510396 A | 3/2003 |
| JP | 2005513229 A | 5/2005 |
| WO | 2001021711 A1 | 3/2001 |
| WO | 2003054073 A1 | 7/2003 |
| WO | 2015087099 A1 | 6/2015 |
| WO | 2018069055 A1 | 4/2018 |
| WO | 2018158224 A1 | 9/2018 |

OTHER PUBLICATIONS

Dorey et al. "On the Impact of Performance of Carbon Fibre Laminates with Epoxy and PEEK Matrices", Composites Science and Technology 23 (1985) 221-237.
English translation of International Search Report for International Application No. PCT/EP2018/054762, dated May 4, 2018, 3 pages.
Gnatowski, A. et al. 2006. Functional materials based on PA6/PVP blends. Journal of Achievements in Materials and Manufacturing Engineering, 18(1-2):91-94.
Zhang et al. "Flame retarding polyamide 6 with melamine cyanurate and layered silicates", Polymers for Advanced Technologies, vol. 19, No. 7, Jul. 2008, pp. 928-936.

*Primary Examiner* — Ana L. Woodward
(74) *Attorney, Agent, or Firm* — Armstrong Teasdale, LLP

(57) ABSTRACT

A thermoplastic molding composition is disclosed. The thermoplastic molding composition includes A) from 20 to 96.9% by weight of a thermoplastic polyamide, B) from 1 to 20% by weight of an inorganic phosphinate salt, C) from 1 to 15% by weight of an organic phosphinate salt, D) from 1 to 15% by weight of melamine cyanurate, E) from 0.1 to 10% by weight of a polyvinylpyrrolidone homopolymer, and F) from 0 to 50% by weight of other additives. The total of the percentages by weight of A) to F) is 100%.

9 Claims, No Drawings

FIRE-RETARDANT POLYAMIDES COMPRISING PVP

CROSS-REFERENCE TO RELATED APPLICATIONS

This application is a U.S. National Phase Application of PCT/EP2018/054762, filed Feb. 27, 2018, which claims the benefit of priority to EP Application No. 17158705.8, filed Mar. 1, 2017, the contents of which are hereby expressly incorporated by reference in their entirety.

The invention relates to thermoplastic molding compositions comprising
- A) from 20 to 96.9% by weight of a thermoplastic polyamide,
- B) from 1 to 20% by weight of an inorganic phosphinate salt,
- C) from 1 to 15% by weight of an organic phosphinate salt,
- D) from 1 to 15% by weight of melamine cyanurate,
- E) from 0.1 to 10% by weight of a polyvinylpyrrolidone homopolymer,
- F) from 0 to 50% by weight of other additives, where the total of the percentages by weight of A) to F) is 100%.

The present invention further relates to flame retardant molding compositions composed of these polyamide mixtures and to the use of such molding compositions for producing fibers, films and moldings, and to the resultant moldings, fibers and films of any type.

Flame-retardant polyamides are increasingly gaining importance. Products of particular interest here are those with pale intrinsic color for the electrical sector. However, although red phosphorus and halogen compounds in combination with synergists are known flame-retardancy systems they are unsuitable for this application sector. Halogen compounds reduce the level of electrical properties such as tracking resistance and dielectric strength. The intrinsic color of red phosphorus prevents its use for pale colors. By way of example, DE-A 1 694 254 recommends the use of melamine for the production of pale-color, unreinforced, flame-retardant polyamides. In the case of glassfiber-reinforced polyamides, melamine and melamine salts are less effective—if these are used without additional flame retardancy synergists—and the glow-wire resistance of these products is very low, specifically when wall thicknesses are low.

In contrast, unreinforced molding compositions, which generally have higher glow-wire resistance, have the disadvantage of inadequate mechanical properties such as stiffness and strength. Although addition of glass fibers to polyamide mixtures with melamine cyanurate improves mechanical properties, flame retardancy properties are adversely affected, because flame retardancy is drastically impaired by what is known as the wicking effect of glass fibers. EP-A 241 702 therefore discloses that the flame retardancy performance of PA mixtures made of glass fibers with melamine cyanurate can be improved by using short glassfibers in the mixture.

The effectiveness of flame retardancy additive mixtures is in essence described via UL 94 V fire tests. However, for certain applications of flame-retardant polymers in systems within buildings, and also in low-voltage switching equipment, the glow-wire test in accordance with IEC 60695-2 12 is an especially significant criterion, while high flame retardancy is also desirable. For particular applications of flame-retardant polymers in the household equipment sector, however, it is the glow-wire test in accordance with IEC 60695-2-13 that is especially important.

When glass fibers are used in the prior art, they can be used in the form of conventional continuous-filament fibers (rovings) or of chopped fibers (fiber bundles of length from 4 to 6 mm). Shear in the extruder then gives a glassfiber-length distribution range in the product that, for conventional processing, is about 250-300 µm (based on a product with 25% glassfiber content). A factor requiring consideration here is that average fiber length generally decreases as fiber content increases, because the extent of fiber interactions increases in the incorporation zone and the extent of fiber breakage therefore increases (F. Raumsteiner, R. Theysohn, Comp. Sci. Techn. 23 (1985) 231).

A combination which has proven particularly suitable in the prior art (WO2015/087099) is that of an inorganic phosphinate salt with an organic phosphinate salt and a melamine compound, which are used in that document in combination with organic compounds having a plurality of hydroxy groups as 4th flame retardant. However, improvement is required to the heat-aging resistance of thermoplastic molding compositions of this type, and to their tendency toward yellowing on exposure to heat.

It was therefore an object of the present invention to provide flame-retardant thermoplastic molding compositions which have good mechanical properties, high flame retardancy and self-extinguishing properties in accordance with UL 94 V, and the shortest possible afterflame times in the glow-wire test in accordance with IEC 60695-2-13, so that they can in particular be used for the household equipment sector.

A further intention was to improve the heat-aging resistance of the thermoplastic molding compositions and their tendency toward yellowing when exposed to heat.

The molding compositions defined in the introduction have accordingly been discovered. Preferred embodiments can be found in the dependent claims.

The molding compositions of the invention comprise, as component A), from 20 to 96.9% by weight, preferably from 30 to 92.5% by weight and in particular from 30 to 80% by weight, of at least one polyamide.

The intrinsic viscosity of the polyamides of the molding compositions of the invention is generally from 90 to 350 ml/g, preferably from 110 to 240 ml/g, determined in 0.5% by weight solution in 96% by weight sulfuric acid at 25° C. in accordance with ISO 307.

Preference is given to semicrystalline or amorphous resins with molar mass Mw (weight average) at least 5000 of the type described by way of example in the U.S. Pat. Nos. 2,071,250, 2,071,251, 2,130,523, 2,130,948, 2,241,322, 2,312,966, 2,512,606 and 3,393,210.

Examples here are polyamides which derive from lactams having from 7 to 13 ring members, for example polycaprolactam, polycaprylolactam and polylaurolactam, and also polyamides which are obtained via reaction of dicarboxylic acids with diamines.

Dicarboxylic acids that can be used are alkanedicarboxylic acids having from 6 to 12 carbon atoms, in particular from 6 to 10 carbon atoms, and aromatic dicarboxylic acids. Mention may be made here of just a few acids: adipic acid, azelaic acid, sebacic acid, dodecanedioic acid and terephthalic and/or isophthalic acid.

Particularly suitable diamines are alkanediamines having from 6 to 12 carbon atoms, in particular from 6 to 8 carbon atoms, and also m-xylylenediamine (e.g. Ultramid® X17 from BASF SE, with a molar ratio of MXDA to adipic acid of 1:1), di(4-aminophenyl)methane, di(4-aminocyclohexyl)

methane, 2,2-di(4-aminophenyl)propane, 2,2-di(4-aminocyclohexyl)propane or 1,5-diamino-2-methylpentane.

Preferred polyamides are polyhexamethyleneadipamide, polyhexamethylenesebacamide and polycaprolactam, and also 6/66 copolyamides, in particular having from 5 to 95% by weight content of caprolactam units (for example Ultramid® C31 from BASF SE).

Polyamides that are further suitable are obtainable from ω-aminoalkyl nitriles, for example aminocapronitrile (PA 6) and adipodinitrile with hexamethylenediamine (PA 66) by what is known as direct polymerization in the presence of water, as described by way of example in DE-A 10313681, EP-A 1198491 and EP 922065.

Mention may moreover also be made of polyamides which are obtainable by way of example via condensation of 1,4-diaminobutane with adipic acid at elevated temperature (polyamide 4,6). Production processes for polyamides of this structure are described by way of example in EP-A 38 094, EP-A 38 582 and EP-A 39 524.

Polyamides further suitable are those obtainable by copolymerization of two or more of the abovementioned monomers, and mixtures of a plurality of polyamides in any desired mixing ratio. Particular preference is given to mixtures of polyamide 66 with other polyamides, in particular 6/66 copolyamides.

Materials that have moreover proven to be particularly advantageous are semiaromatic copolyamides such as PA 6/6T and PA 66/6T, the triamine content of which is less than 0.5% by weight, preferably less than 0.3% by weight (see EP-A 299 444). Other polyamides with high temperature resistance are disclosed in EP-A 19 94 075 (PA 6T/6I/MXD6).

The preferred semiaromatic copolyamides with low triamine content may be produced by the processes described in EP-A 129 195 and 129 196.

The following nonexhaustive list contains the polyamides mentioned and also other polyamides A) within the meaning of the invention, and the monomers comprised.

AB Polymers:
PA ε-caprolactam
PA 7 enantholactam
PA 8 caprylolactam
PA 9 9-aminopelargonic acid
PA 11 11-aminoundecanoic acid
PA 12 laurolactam AA/BB Polymers
PA 46 tetramethylenediamine, adipic acid
PA 66 hexamethylenediamine, adipic acid
PA 69 hexamethylenediamine, azelaic acid
PA 610 hexamethylenediamine, sebacic acid
PA 612 hexamethylenediamine, decanedicarboxylic acid
PA 613 hexamethylenediamine, undecanedicarboxylic acid
PA 1212 1,12-dodecanediannine, decanedicarboxylic acid
PA 1313 1,13-diaminotridecane, undecanedicarboxylic acid
PA 6T hexamethylenediamine, terephthalic acid
PA 9T 1,9-nonanediamine, terephthalic acid
PA MXD6 m-xylylenediamine, adipic acid
PA 6I hexamethylenediamine, isophthalic acid
PA 6-3-T trimethylhexamethylenediamine, terephthalic acid
PA 6/6T (see PA 6 and PA 6T)
PA 6/66 (see PA 6 and PA 66)
PA 6/12 (see PA 6 and PA 12)
PA 66/6/610 (see PA 66, PA 6 and PA 610)
PA 6I/6T (see PA 6I and PA 6T)
PA PACM 12 diaminodicyclohexylmethane, dodecanedioic acid
PA 6I/6T/PACM as PA 6I/6T+diaminodicyclohexylmethane
PA 12/MACMI laurolactam, dimethyldiaminodicyclohexylmethane, isophthalic acid
PA 12/MACMT laurolactam, dimethyldiaminodicyclohexylmethane, terephthalic acid
PA PDA-T phenylenediamine, terephthalic acid
PA410 1,4-tetramethylenediamine, sebacic acid
PA510 1,5-pentamethylenediamine, sebacic acid
PA10T 1,10-decanediamine, terephthalic acid The molding compositions of the invention comprise, as component B), from 1 to 20% by weight, in particular from 5 to 20% by weight, preferably from 5 to 15% by weight, of an inorganic phosphinate salt.

Preferred components B) are metal salts of an inorganic phosphinic acid which correspond to the formula (I):

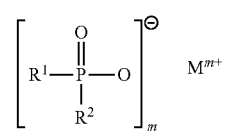

in which $R^1$ and $R^2$ are hydrogen and
M=Mg, Ca, Al, Zn and
m=from 1 to 3.

Particularly preferred molding compositions comprise, as component B), aluminum hypophosphite or mixtures of said component.

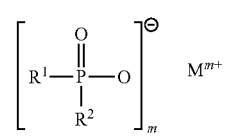

The molding compositions of the invention comprise, as component C), from 1 to 15% by weight, preferably from 1 to 10% by weight and in particular from 2 to 8% by weight, based on the entirety of components A) to F), of an organic phosphinate salt.

Phosphinic salts of the formula (II) are suitable as preferred component C)
in which $R^1$ and $R^2$ are identical or different and are
$C_1$-$C_6$-alkyl, linear or branched and/or aryl;
M=Mg, Ca, Al, Ti, Zn, Fe, Li, Na, K or a protonated nitrogen base
m is from 1 to 5.

It is preferable that $R^1$ and $R^2$ of component B) are identical or different and are methyl, ethyl, n-propyl, isopropyl, n-butyl, tert-butyl, n-pentyl and/or phenyl.

Preferred components C) are aluminum salts of a dialkylphosphinic acid of the formula (II).

It is particularly preferable that $R^1$ and $R^2$ are methyl or ethyl and that M=Al, particular preference being given here to Al diethylphosphinate.

The phosphinates are preferably produced via precipitation of the appropriate metal salts from aqueous solutions. However, the phosphinates may also be precipitated in the presence of a suitable inorganic metal oxide or suitable inorganic metal sulfide as support material (white pigments, for example $TiO_2$, $SnO_2$, ZnO, ZnS, $SiO_2$). Surface-modified pigments are thus obtained which can be used as laser-markable flame retardants.

The molding compositions of the invention comprise, as component D), from 1 to 15% by weight, preferably from 1 to 10% by weight, and in particular from 2 to 8% by weight, of melamine cyanurate.

The melamine cyanurate suitable in the invention (component D)) is a reaction product of preferably equimolar quantities of melamine (formula I) and cyanuric acid or isocyanuric acid (formulae Ia and Ib).

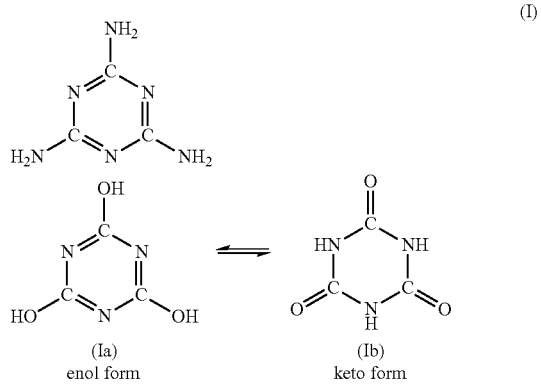

(Ia) enol form
(Ib) keto form

This is obtained by way of example via reaction of aqueous solutions of the starting compounds at from 90 to 100° C. The product obtainable commercially is a white powder with average grain size $d_{50}$ from 1.5 to 7 μm and with $d_{99}$ value smaller than 50 μm.

It is very particularly preferable in the invention to use melamine cyanurate, the particle size distribution of which is preferably:

$d_{98}$<25 μm, preferably <20 μm $d_{50}$<4.5 μm, preferably <3 μm.

A $d_{50}$ value is generally understood by the person skilled in the art to be the particle size value selected in such a way that the particle size of 50% of the particles is smaller than, and the particle size of 50% of the particles is greater than, said value.

Particle size distribution is typically determined by laser scattering (by a method based on ISO 13320).

The molding compositions of the invention comprise, as component E), from 0.1 to 10% by weight, preferably from 0.5 to 8% by weight and in particular from 0.5 to 5% by weight, of a polyvinylpyrrolidone homopolymer.

These PVP polymers are obtainable in the form of aqueous solutions or in the form of powder, preference being given here to pulverulent material.

PVP homopolymers are generally obtainable via free-radical polymerization of 1-vinylpyrrolidin-2-one by bulk, solution or suspension polymerization processes in the presence of free-radical generators and mostly in the presence of aliphatic amines which suppress the decomposition of the monomer during the reaction.

Suitable products are obtainable commercially with the trademark Luvitec® from BASF SE.

Preferred components E) are those in which the molar mass Mn (number average) of component E) measured by GPC (PVP standard and water/methanol (80/20) with 0.01 mol/L of phosphate buffer (pH 7.4) as eluent) is from 1000 to 500 000 g/mol, preferably from 1500 to 200 000 g/mol.

Preferred components E) have the following particle sizes:

$d_{10}$ from 15 to 90, in particular from 15 to 60 μm, $d_{50}$ from 50 to 180, in particular from 50 to 160 μm, $d_{90}$ from 100 to 350, in particular from 100 to 320 μm.

The particle sizes can generally be determined by means of laser scattering on the powder (Sympatec-Helos Rodos).

The molding compositions of the invention can comprise, as component F), from 0 to 50% by weight, preferably up to 40% by weight and in particular up to 30% by weight, of other additives.

Fibrous or particulate fillers F) that may be mentioned are carbon fibers, glass fibers, glass beads, amorphous silica, calcium silicate, calcium metasilicate, magnesium carbonate, kaolin, chalk, powdered quartz, mica, barium sulfate and feldspar; these can be used in quantities of from 0 to 50% by weight, preferably from 5 to 50% by weight, in particular from 10 to 40% by weight.

Preferred fibrous fillers that may be mentioned are carbon fibers, aramid fibers and potassium titanate fibers, particular preference being given here to glass fibers in the form of E glass. These can be used in the form of rovings or chopped glass in the forms commercially available.

The fibrous fillers can have been surface-pretreated with a silane compound in order to improve compatibility with the thermoplastic.

Suitable silane compounds are those of the general formula

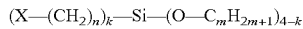

in which the substituents are defined as follows:

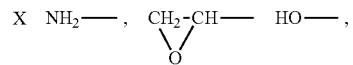

n an integer from 2 to 10, preferably from 3 to 4 m an integer from 1 to 5, preferably from 1 to 2 k an integer from 1 to 3, preferably 1.

Preferred silane compounds are aminopropyltrimethoxysilane, aminobutyltrimethoxysilane, aminopropyltriethoxysilane, aminobutyltriethoxysilane and also the corresponding silanes which comprise a glycidyl group as substituent X.

Quantities of the silane compounds generally used for surface-coating are from 0.01 to 2% by weight, preferably from 0.025 to 1.0% by weight and in particular from 0.05 to 0.5% by weight (based on F)).

Acicular mineral fillers are also suitable.

For the purposes of the invention, the expression acicular mineral fillers means a mineral filler with distinctly acicular character. An example that may be mentioned is acicular wollastonite. The L/D (length to diameter) ratio of the mineral is preferably from 8:1 to 35:1, preferably from 8:1 to 11:1. The mineral filler may optionally have been pre-treated with the abovementioned silane compounds; however, pretreatment is not an essential requirement.

Other fillers that may be mentioned are kaolin, calcined kaolin, wollastonite, talc and chalk, precipitated calcite and also lamellar or acicular nanofillers, preferably in quantities of from 0.1 to 10%. Materials preferably used for this purpose are mica, bohnnite, bentonite, montmorillonite, vermiculite, zinc oxide in acicular form and hectorite. In order to obtain good compatibility between the lamellar nanofillers and the organic binder, the lamellar nanofillers are subjected to prior-art organic modification. Addition of the lamellar or acicular nanofillers to the nanocomposites of the invention leads to a further increase in mechanical strength.

The molding compositions can comprise, as component F), quantities of from 1 to 10% by weight, preferably from 0.5 to 10% by weight, in particular from 1 to 8% by weight, of elastomeric polymers (also often termed impact modifiers, elastomers or rubbers).

These are very generally copolymers preferably composed of at least least two of the following monomers: ethylene, propylene, butadiene, isobutene, isoprene, chloroprene, vinyl acetate, styrene, acrylonitrile and (meth)acrylate having from 1 to 18 carbon atoms in the alcohol component.

Polymers of this type are described by way of example in Houben-Weyl, Methoden der organischen Chemie [Methods of organic chemistry], vol. 14/1 (Georg-Thieme-Verlag, Stuttgart, 1961), pages 392 to 406, and in the monograph "Toughened Plastics" (Applied Science Publishers, London, 1977) by C. B. Bucknall.

Some preferred types of these elastomers are set out below:

Preferred components F) are impact modifiers based on ethylene copolymers which are composed of:

$F_1$) from 40 to 98% by weight, preferably from 50 to 94.5% by weight, of ethylene $F_2$) from 2 to 40% by weight, preferably from 5 to 40% by weight, of a (meth)acrylate having from 1 to 18 carbon atoms, or/and $F_3$) from 0 to 20% by weight, preferably from 0.05 to 10% by weight, of functional monomers selected from the group of the ethylenically unsaturated mono and dicarboxylic acids and carboxylic anhydrides and epoxy groups and mixtures of these, where the total of the percentages by weight of $F_1$) to $F_3$) is 100%, or are an ethylene-(meth)acrylic acid copolymer which has been up to 72% zinc-neutralized.

Particular preference is given to ethylene copolymers composed of:

$F_1$) from 50 to 69.9% by weight of ethylene $F_2$) from 30 to 40% by weight of a (meth)acrylate having from 1 to 18 carbon atoms $F_3$) from 0.1 to 10% by weight of functional monomers as in claim 1, where the total of the percentages by weight $F_1$) to $F_3$) is 100%.

The content of the functional groups of $F_3$) is from 0.05 to 5% by weight, preferably from 0.2 to 4% by weight and in particular from 0.3 to 3.5% by weight, based on 100% by weight of F).

Particularly preferred components $F_3$) are composed of an ethylenically unsaturated mono or dicarboxylic acid or of a functional derivative of said acid.

In principle, any of the primary, secondary and tertiary $C_1$-$C_{18}$-alkyl esters of acrylic acid or methacrylic acid $D_2$ is suitable, but preference is given to esters having from 1 to 12 carbon atoms, in particular having from 2 to 10 carbon atoms.

Examples here are methyl, ethyl, propyl, n-butyl, isobutyl and tert-butyl, 2-ethylhexyl, octyl and decyl acrylates and the corresponding esters of methacrylic acid. Among these, particular preference is given to n-butyl acrylate and 2-ethylhexyl acrylate.

The olefin polymers can also comprise, in addition to the esters, acid-functional and/or latently acid-functional monomers of ethylenically unsaturated mono- or dicarboxylic acids, or can comprise monomers having epoxy groups.

Other examples that may be mentioned for monomers $F_3$) are acrylic acid, methacrylic acid, tertiary alkyl esters of these acids, in particular butyl acrylate, and dicarboxylic acids such as maleic acid and fumaric acid, and anhydrides of these acids, and also monoesters thereof.

The expression latently acid-functional monomers means compounds which form free acid groups under the polymerization conditions or during incorporation of the olefin polymers into the molding compositions. Examples that may be mentioned for these include anhydrides of dicarboxylic acids having up to 20 carbon atoms, in particular maleic anhydride, and tertiary $C_1$-$C_{12}$ alkyl esters of the abovementioned acids, in particular tert-butyl acrylate and tert-butyl methacrylate.

The ethylene copolymers described above can be produced by processes known per se, preferably via random copolymerization at high pressure and elevated temperature.

The melt index of the ethylene copolymers is generally in the range from 1 to 80 g/10 min (measured at 190° C. with 2.16 kg load).

The molar mass of these ethylene copolymers is from 10 000 to 500 000 g/mol, preferably from 15 000 to 400 000 g/mol (Mn determined by GPC in 1,2,4-trichlorobenzene with PS calibration). Commercially available products preferably used are Fusabond® A 560, Lucalen® A 2910, Lucalen® A 3110, Nucrel 3990, Nucrel 925, Lotader AX 9800, and Igetabond FS 7 M.

The ethylene copolymers described above may be produced via processes known per se, preferably via random copolymerization at high pressure and elevated temperature. Corresponding processes are well known.

Other preferred elastomers are emulsion polymers, production of which is described by way of example by Blackley in the monograph "Emulsion Polymerization". The emulsifiers and catalysts that can be used are known per se.

Preference is in particular given to copolymers which comprise no $F_2$) units, but where the acid component $F_3$) has been Zn-neutralized. Preference is given here to ethylene-(meth)acrylic acid copolymers which have been up to 72% zinc-neutralized (obtainable commercially as Surlyn® 9520 from DuPont).

It is also, of course, possible to use mixtures of the rubber types listed above.

The molding compositions of the invention can comprise, as component F), from 0.05 to 3% by weight, preferably from 0.1 to 1.5% by weight and in particular from 0.1 to 1% by weight, of a lubricant.

Preference is given to aluminum salts, alkali metal salts, alkaline earth metal salts or esters or amides of fatty acids having from 10 to 44 carbon atoms, preferably having from 12 to 44 carbon atoms.

The metal ions are preferably alkaline earth metal and Al, particular preference being given to Ca or Mg.

Preferred metal salts are Ca stearate and Ca montanate, and also aluminum stearate.

It is also possible to use mixtures of various salts in any desired mixing ratio.

The carboxylic acids may be mono- or dibasic. Examples that may be mentioned are pelargonic acid, palmitic acid, lauric acid, margaric acid, dodecanedioic acid, behenic acid, and particularly preferably stearic acid, capric acid and montanic acid (mixture of fatty acids having from 30 to 40 carbon atoms).

The aliphatic alcohols may be mono- to tetrahydric. Examples of alcohols are n-butanol, n-octanol, stearyl alcohol, ethylene glycol, propylene glycol, neopentyl glycol, and pentaerythritol, preference being given here to glycerol and pentaerythritol.

The aliphatic amines can be mono to trifunctional. Examples here are stearylamine, ethylenediamine, propylenediamine, hexamethylenediamine, and di(6-aminohexyl) amine, particular preference being given here to ethylenediamine and hexamethylenediamine. Preferred esters or amides are correspondingly glyceryl distearate, glyceryl tristearate, ethylenediamine distearate, glyceryl monopalmitate, glyceryl trilaurate, glyceryl monobehenate and pentaerythrityl tetrastearate.

It is also possible to use mixtures of various esters or amides or esters combined with amides, in which case the mixing ratio is as desired.

The molding compositions of the invention can comprise, as component F), from 0.05 to 3% by weight, preferably from 0.1 to 1.5% by weight and in particular from 0.1 to 1% by weight, of a Cu stabilizer, preferably a Cu(I) halide, in particular in a mixture with an alkali metal halide, preferably KJ, in particular in a ratio of 1:4.

Monovalent copper salts that can preferably be used are copper(I) complexes with $PPh_3$, copper(I) acetate, and copper(I) chloride, bromide and iodide. Quantities comprised of these correspond to from 5 to 500 ppm of copper, preferably from 10 to 250 ppm, based on polyamide.

The advantageous properties are in particular obtained when the copper takes the form of molecular dispersion in the polyamide. This is achieved when a concentrate added to the molding composition comprises the polyamide, a salt of monovalent copper and an alkali metal halide in the form of a solid homogeneous solution. A typical concentrate is composed by way of example of from 79 to 95% by weight of polyamide and from 21 to 5% by weight of a mixture of copper iodide or copper bromide and potassium iodide. The concentration of copper in the solid homogeneous solution is preferably between 0.3 and 3% by weight, in particular from 0.5 to 2% by weight, based on the total weight of the solution, and the molar ratio of copper(I) iodide to potassium iodide is from 1 to 11.5, preferably from 1 to 5.

Suitable polyamides for the concentrate are homopolyamides and copolyamides, in particular polyamide 6 and polyamide 6.6.

Suitable sterically hindered phenols F) are in principle any of the compounds having phenolic structure which have at least one bulky group on the phenolic ring.

It is preferable to use by way of example compounds of the formula

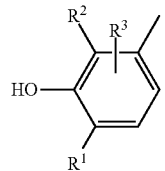

where:
$R^1$ and $R^2$ are an alkyl group, a substituted alkyl group or a substituted triazole group, where the moieties $R^1$ and $R^2$ can be identical or different and $R^3$ is an alkyl group, a substituted alkyl group, an alkoxy group or a substituted amino group.

Antioxidants of the type mentioned are described by way of example in DE-A 27 02 661 (U.S. Pat. No. 4,360,617).

Another group of preferred sterically hindered phenols derives from substituted benzenecarboxylic acids, in particular from substituted benzenepropionic acids.

Particularly preferred compounds from this class are compounds of the formula

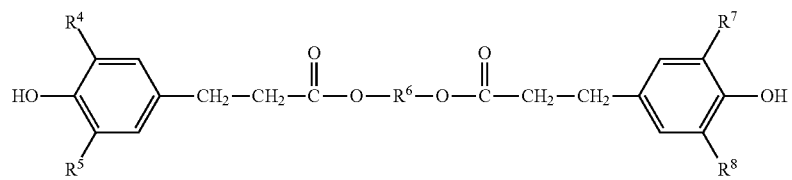

where $R^4$, $R^5$, $R^7$ and $R^8$ are mutually independently $C_1$-$C_8$ alkyl groups which can themselves have substitution (at least one thereof being a bulk group), and $R^6$ is a divalent aliphatic moiety which has from 1 to 10 carbon atoms and which can also have C—O bonds in the main chain.

Preferred compounds of this formula are

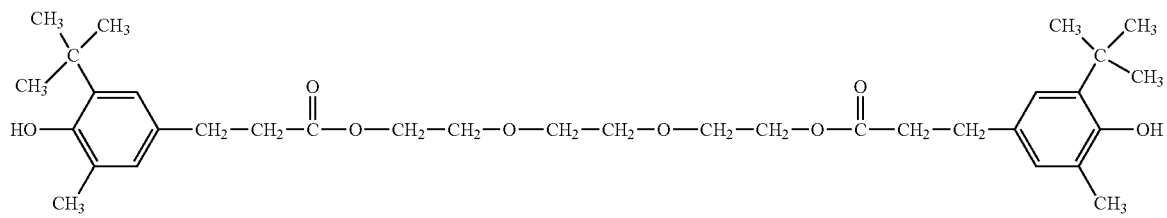 [SMILES: Cc1cc(CCC(=O)OCCOCCOCCOC(=O)CCc2cc(C)c(O)c(C(C)(C)C)c2)cc(C(C)(C)C)c1O]

(Irganox® 245 from BASF SE)

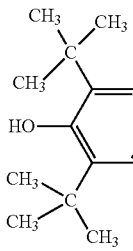 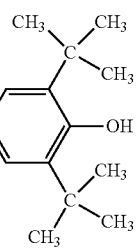

(Irganox® 259 from BASF SE)

Examples of sterically hindered phenols that may be mentioned include:
2,2'-methylenebis(4-methyl-6-tert-butylphenol), 1,6-hexanediol bis[3-(3,5-di-tert-butyl-4-hydroxyphenyl)propionate], pentaerythrityl tetrakis[3-(3,5-di-tert-butyl-4-hydroxyphenyl)propionate], distearyl 3,5-di-tert-butyl-4-hydroxybenzylphosphonate, 2,6,7-trioxa-1-phosphabicyclo[2.2.2]oct-4-ylmethyl 3,5-di-tert-butyl-4-hydroxyhydrocinnamate, 3,5-di-tert-butyl-4-hydroxyphenyl-3,5-distearylthiotriazylamine, 2-(2'-hydroxy-3'-hydroxy-3',5'-di-tert-butylphenyl)-5-chlorobenzotriazole, 2,6-di-tert-butyl-4-hydroxymethylphenol, 1,3,5-trimethyl-2,4,6-tris(3,5-di-tert-butyl-4-hydroxybenzyl)benzene, 4,4'-methylenebis(2,6-di-tert-butylphenol), 3,5-di-tert-butyl-4-hydroxybenzyldimethylamine.

The following have proven to be particularly effective and are therefore preferably used: 2,2'-methylenebis(4-methyl-6-tert-butylphenol), 1,6-hexanediol bis[3-(3,5-di-tert-butyl-4-hydroxyphenyl)propionate] (Irganox® 259), pentaerythrityl tetrakis[3-(3,5-di-tert-butyl-4-hydroxyphenyl)propionate], and also N,N'-hexamethylenebis-3,5-di-tert-butyl-4-hydroxyhydrocinnamide (Irganox® 1098) and the Irganox® 245 described above from BASF SE, which has particularly good suitability.

The quantity comprised of the antioxidants F), which can be used individually or in the form of mixtures, is from 0.05 to 3% by weight, preferably from 0.1 to 1.5% by weight, in particular from 0.1 to 1% by weight, based on the total weight of the molding compositions A) to F).

In some cases, sterically hindered phenols having not more than one sterically hindered group in ortho-position with respect to the phenolic hydroxy group have proven particularly advantageous, in particular when colorfastness is assessed during storage in diffuse light for prolonged periods.

The molding compositions of the invention can comprise, as component F), from 0.05 to 5% by weight, preferably from 0.1 to 2% by weight and in particular from 0.25 to 1.5% by weight, of a nigrosin.

Nigrosins are generally a group of black or gray phenazine dyes (azine dyes) in various embodiments (water-soluble, liposoluble, gasoline-soluble), and are related to the indulines, and are used in wool dyeing and printing, for providing black color to silks, and for dyeing leather and for shoe polishes, varnishes, plastics, heat-cured coatings, inks and the like, and also as microscopy dyes.

Nigrosins are obtained industrially by heating nitrobenzene, aniline and aniline hydrochloride with metallic iron and $FeCl_3$ (name derives from the Latin niger=black).

Component F) can be used in the form of free base or else in the form of salt (e.g. hydrochloride).

Further details relating to nigrosins can be found by way of example in the electronic encyclopedia Rompp Online, Version 2.8, Thieme-Verlag Stuttgart, 2006, keyword "Nigrosin".

The thermoplastic molding compositions of the invention can comprise, as component F), conventional processing aids such as stabilizers, oxidation retarders, agents to counter decomposition due to heat and decomposition due to ultraviolet light, lubricants and mold-release agents, colorants such as dyes and pigments, nucleating agents, plasticizers, etc.

Examples of oxidation retarders and heat stabilizers are sterically hindered phenols and/or phosphites and amines (e.g. TAD), hydroquinones, aromatic secondary amines such as diphenylamines, various substituted members of these groups and mixtures of these in concentrations of up to 1% by weight, based on the weight of the thermoplastic molding compositions.

UV stabilizers that may be mentioned, quantities used of which are generally up to 2% by weight, based on the molding composition, are various substituted resorcinols, salicylates, benzotriazoles and benzophenones.

The following can be added as colorants: inorganic pigments, for example titanium dioxide, ultramarine blue, iron oxide and carbon black, and moreover organic pigments, for example phthalocyanines, quinacridones, perylenes, and also dyes, for example anthraquinones.

Nucleating agents which can be used are sodium phenylphosphinate, aluminum oxide, silicon dioxide, and also preferably talc.

The thermoplastic molding compositions of the invention may be produced by processes known per se by mixing the starting components in customary mixing apparatuses, for example screw extruders, Brabender mixers or Banbury mixers, and then extruding the resultant mixture. The extrudate may be cooled and comminuted. It is also possible to premix individual components and then add the remaining starting materials individually and/or likewise in the form of a mixture. The mixing temperatures are generally from 230° C. to 320° C.

In another preferred mode of operation, components B) to F) can be mixed with a prepolymer, compounded and pelletized. The pelletized material obtained is then condensed to the desired viscosity continuously or batchwise under inert gas in the solid phase at a temperature below the melting point of component A).

Features of the thermoplastic molding compositions of the invention are good mechanical properties, high flame retardancy and self-extinguishing properties in accordance with UL 94 V, and said molding compositions exhibit very short afterflame times in the glow-wire test in accordance with IEC 60695-2-13, and these materials can in particular be used for the household equipment sector.

The thermoplastic molding compositions moreover have improved heat-aging resistance and less tendency toward yellowing on exposure to heat.

They are therefore suitable for the production of fibers, films and moldings of any type. Examples are: plug connectors, plugs, plug parts, cable harness components, circuit mounts, circuit-mount components, three-dimensionally injection-molded circuit mounts, electrical connection elements and mechatronic components.

The moldings or semifinished products to be produced in the invention from the thermoplastic molding compositions can be used by way of example in the motor vehicle, electrical, electronics, telecommunications, information technology, entertainment or computer industry, in vehicles and other means of transportation, in ships, spacecraft, in the household, in office equipment, in sport, in medicine, and also generally in products and parts of buildings requiring increased flame retardancy.

Possible uses of polyamides with improved flowability for the kitchen and household sectors are production of components for kitchen appliances, for example fryers, smoothing irons, knobs/buttons, and also applications in the garden and leisure sector.

EXAMPLES

The following components were used:
Component A:
Polyamide 6 with intrinsic viscosity IV 107 ml/g, measured on a 0.5% by weight solution in 96% by weight sulfuric acid at 25° C. in accordance with ISO 307 (Ultramid® B22 from BASF SE).
Component B:
Aluminum hypophosphite (Phoslite® IP-A from Italmatch Chemicals SPA).
Component C:
Aluminum salt of diethylphosphinic acid (Exolit® OP1230 from Clariant GmbH).
Component D:
Melamine cyanurate with average particle size ~2.6 μm (Melapur® MC 25 from BASF SE).
Component E/1V: for Comparison
Ethylene-vinyl alcohol copolymer with 29% ethylene content (Soarnol® DT2904RB from Nippon Gohsei).
Component E/2:
Pulverulent polyvinylpyrrolidone homopolymer with number-average molecular weight Mn from 1500 to 2500 daltons (Luvitec® K17 from BASF SE).
Component E/3:
Pulverulent polyvinylpyrrolidone homopolymer with number-average molecular weight Mn from 11 000 to 18 000 daltons (Luvitec® K30 from BASF SE).
Component E/4:
Polyvinylpyrrolidone homopolymer with number-average molecular weight Mn from 300 000 to 400 000 daltons (Luvitec® K90 from BASF SE).
Component F/1:
Standard chopped glassfiber for polyamides, L=4.0 mm, D=10 μm.
Component F/2 (PVP Premix):
Formulations F1-F5 used the following further additives: 0.35% of 3,3'-bis(3,5-di-tert-butyl-4-hydroxyphenyl)-N,N'-hexamethylenedipropionamide (CAS No. 23128-74-7) as heat stabilizer and 0.4% of ethylenebisstearamide (CAS No. 110-30-5) as processing aid.
Component F/2 (EvOH Premix):
Formulation V1 used the following further additives: 0.35% of 3,3'-bis(3,5-di-tert-butyl-4-hydroxyphenyl)-N,N'-hexamethylenedipropionamide (CAS No. 23128-74-7) and 0.2% of ethylenebis(oxyethylene) bis(3-(5-tert-butyl-4-hydroxy-m-tolyl)propionate) (CAS No. 36443-68-2) as heat stabilizers and 0.4% of ethylenebisstearamide (CAS No. 110-30-5) as processing aid.

The sum of the proportions of components A) to F) in table 1 is 100% by weight. The constitutions of the molding compositions and the results of the tests can likewise be found in table 1.

Production of Molding Compositions

Appropriate plastics molding compositions were prepared by compounding. For this, the individual components were mixed at throughput 20 kg/h in a ZSK 26 (Berstorff) twin-screw extruder with a flat temperature profile at about 250-270° C., discharged in the form of strand, cooled until pelletizable and pelletized.

The test samples for the tests listed in table 1 were injection-molded in an Arburg 420C injection-molding machine at melt temperature about 250-290° C. and mold temperature about 80° C.

Flame retardancy of the molding compositions was determined by the UL 94 V method (Underwriters Laboratories Inc. Standard of Safety, "Test for Flammability of Plastic Materials for Parts in Devices and Appliances", p. 14 to p. 18, Northbrook 1998).

Glow-wire resistance was determined by the GWFI (glow-wire flammability index) glow-wire ignition test in accordance with DIN EN 60695-2-12 and the GWIT (glow-wire ignition temperature) glow-wire ignition test in accordance with DIN EN 60695-2-13.

The GWFI test, carried out on 3 test samples (for example plaques measuring 60×60×1.0 mm or disks), used a glowing wire at temperatures of from 650 to 960° C. to determine the maximal temperature leading to no ignition during a time including the period of exposure to the glow-wire in 3 successive tests. The test sample was pressed by a force of 1 Newton for a period of 30 seconds against a heated glow-wire. The penetration depth of the glow-wire was restricted to 7 mm. The test is considered passed if the afterflame time of the test sample after removal of the glow-wire is less than 30 seconds and if tissue paper placed under the test sample does not ignite.

The GWIT test, carried out on 3 test samples (for example plaques measuring 0×60×1.5 mm), used a glowing wire at temperatures of from 650 to 960° C. to determine the maximal temperature leading to no ignition during a time including the period of exposure to the glow-wire in 3 successive tests. The glow-wire ignition temperature stated was 25 K above the maximal temperature determined. The ignition criterion used here was a flame with flame time >5 sec.

The molding compositions (for example plaques measuring 60×60×1.5 mm) were heat-aged in a convection oven at the respective stated temperature.

Color was measured in accordance with DIN 53236, R45/0° illumination, in accordance with CIE L*a*b.

The data in table 1 show that the compositions Inv1-Inv5 exhibit better values than the prior art (Comp. 1) both in respect of flame retardancy at low wall thicknesses (UL 94 V-2 at 0.4 mm) and in relation to thermal stability. The MVR results reveal that melt stability at prolonged residence times does not increase as sharply as for Comp. 1 after 20 min. Color measurement after/during heat-aging at 150° C. moreover shows that yellowing of the molding compositions of the invention proceeds less rapidly than in the prior art (smaller delta E values).

The reduced stabilizes amount in V3 is mirrored in the reduced thermal ageing stability.

TABLE 1

Constitutions and properties

| Component/Test method | Inv1 | Inv2 | Inv3 | Inv4 | Inv5 | Comp. 1 | Comp. 2 | Comp. 3 |
|---|---|---|---|---|---|---|---|---|
| A/1 | 45.25 | 44.25 | 43.25 | 43.25 | 43.25 | 44.55 | 46.25 | 44.75 |
| B | 11.3 | 11.3 | 11.3 | 11.3 | 11.3 | 11.3 | 11.3 | 11.3 |
| C | 5 | 5 | 5 | 5 | 5 | 5 | 5 | 5 |
| D | 6.7 | 6.7 | 6.7 | 6.7 | 6.7 | 6.7 | 6.7 | 6.7 |
| E/1 | | | | | | 1.5 | | 1.5 |
| E/2 | 1 | 2 | 3 | | | | | |
| E/3 | | | | 3 | | | | |
| E/4 | | | | | 3 | | | |
| F/1 | 30 | 30 | 30 | 30 | 30 | 30 | 30 | 30 |
| F/2 | 0.75 | 0.75 | 0.75 | 0.75 | 0.75 | | 0.75 | 0.75 |
| F/3 | | | | | | 0.95 | | |
| Intrinsic viscosity in H2SO4/cm3/g (ISO307) | 113 | 111 | 110 | 120 | 135 | 113 | 122 | 112 |
| Tensile modulus of elasticity/MPa (ISO 527) | 12307 | 12411 | 12268 | 12494 | 12449 | 12063 | 11515 | 11926 |
| Tensile stress at break/MPa (ISO 527) | 167 | 168 | 171 | 170 | 166 | 172 | 148 | 174 |
| Tensile strain at break/% (ISO 527) | 2.7 | 2.5 | 2.6 | 2.5 | 2.4 | 2.5 | 3.0 | 2.6 |
| MVR 275° C./5 Kg (ISO1133) | 119 | 118 | — | 96 | 66 | 33 | 42 | 28 |
| MVR 275° C./5 Kg (ISO1133) after 10 min | 98 | 101 | — | 66 | 66 | 78 | — | 64 |
| MVR 275° C./5 Kg (ISO1133) after 20 min | 67 | 75 | — | 67 | 45 | >500 | — | 434 |
| UL 94 V test (0.4 mm) | V-2 | V-2 | V-2 | V-2 | V-2 | n.c. | n.c. | n.c. |
| UL 94 V test (0.8 mm) | V-0 | V-0 | V-0 | V-0 | V-0 | V-0 | V-2 | V-0 |
| GWFI 960° C./1.5 mm | passed | passed | passed | passed | passed | passed | passed | passed |
| GWIT max, 1.5 mm/° C. | 825 | 825 | 825 | 825 | 825 | 875 | 825 | 850 |
| GWIT 775° C./1.5 mm | passed | passed | passed | passed | passed | passed | passed | passed |
| Tensile stress at break after 500 h of heat-aging at 150° C./MPa (ISO 527)/% from initial value | 119 | 124 | | | | 122 | | 95 |
| | 72 | 74 | | | | 71 | | 51 |
| Color measurement after 24 h of heat-aging at 150° C./delta E (DIN 53236) | 18 | 21 | | | | 32 | | 36 |
| Color measurement after 48 h of heat-aging at 150° C./delta E (DIN 53236) | 26 | 27 | | | | 43 | | 43 | water/methanol (80/20) with 0.01 mol/L of phosphate buffer at pH 7.14 as eluent.

2. The thermoplastic molding composition according to claim 1, comprising:
A) from 30 to 92.5% by weight,
B) from 5 to 20% by weight,
C) from 1 to 10% by weight,
D) from 1 to 10% by weight,
E) from 0.5 to 8% by weight,
F) from 0 to 40% by weight,
where the total of the percentages by weight of A) to F) is 100%.

3. The thermoplastic molding composition according to claim 1, in which component B) is a metal salt of an inorganic phosphinic acid of formula (I):

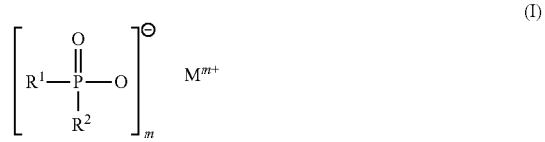

The invention claimed is:

1. A thermoplastic molding composition comprising
A) from 20 to 96.9% by weight of a thermoplastic polyamide,
B) from 1 to 20% by weight of an inorganic phosphinate salt,
C) from 1 to 15% by weight of an organic phosphinate salt,
D) from 1 to 15% by weight of melamine cyanurate,
E) from 0.1 to 10% by weight of a polyvinylpyrrolidone homopolymer,
F) from 0 to 50% by weight of other additives,
where the total of percentages by weight of A) to F) is 100% and component E) a number average molar mass Mn measured by GPC of from 1,000 to 500,000 g/mol, wherein the GPC is carried out with PVP standard and in which R¹ and R² are hydrogen and M=Mg, Ca, Al, Zn and m=from 1 to 3.

4. The thermoplastic molding composition according to claim 1, comprising aluminum hypophosphite as component B).

5. The thermoplastic molding composition according to claim 1, in which component C) is an organic phosphinate salt of formula (II):

(II)

in which R¹ and R² are identical or different and are
$C_1$-$C_6$-alkyl, linear or branched and/or aryl; and M=Mg, Ca, Al, Ti, Zn, Fe, Li, Na, K or a protonated nitrogen base and m is from 1 to 5.

6. The thermoplastic molding composition according to claim 5, in which component C) is an aluminum salt of a dialkylphosphinic acid of formula (II).

7. The thermoplastic molding composition according to claim 1, in which component E) is pulverulent.

8. The thermoplastic molding composition according to claim 1, in which component E) has a $d_{50}$ value of from 40 to 180 μm, determined by means of laser scattering on powder.

9. A fiber, film or molding obtainable from the thermoplastic molding compositions according to claim 1.

* * * * *